No. 665,306. Patented Jan. 1, 1901.
N. E. BOYD.
BICYCLE BRAKE.
(Application filed July 17, 1899.)
(No Model.)
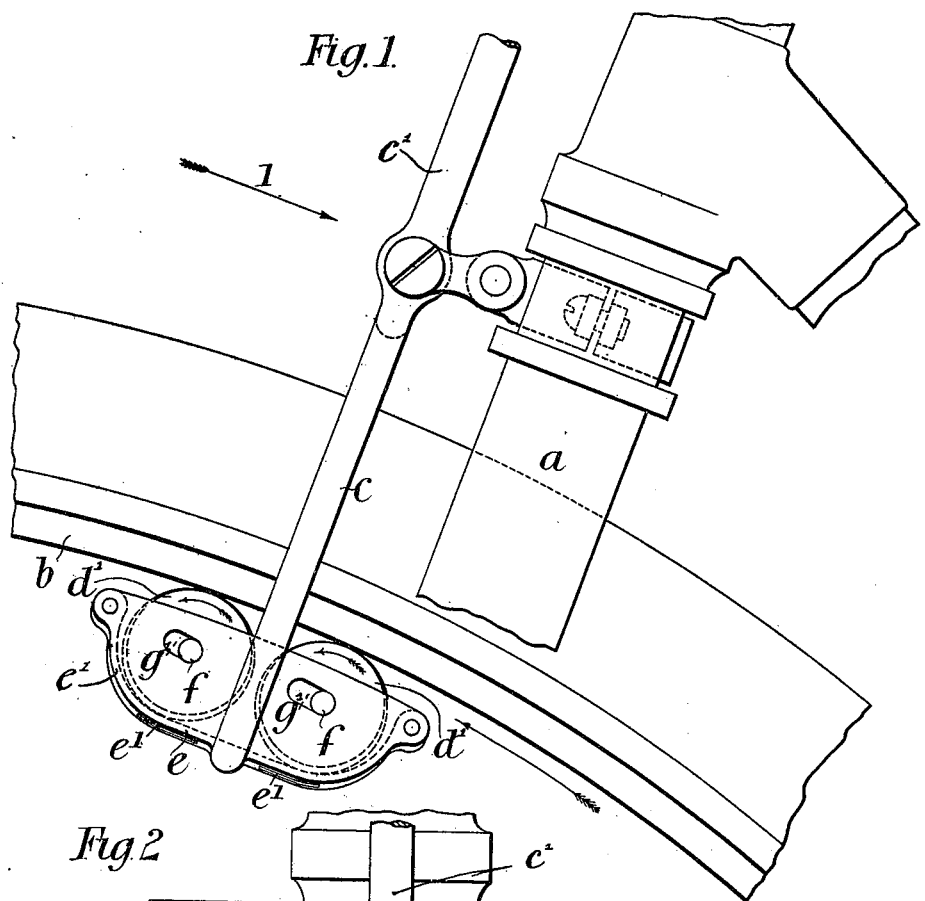
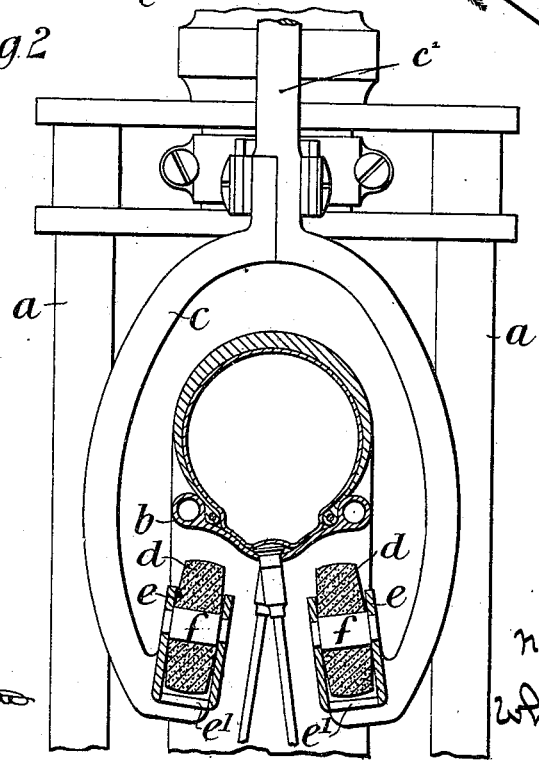
Witnesses.
J. D. Kingsbury
B. W. Brockett
Inventor.
Nathan E. Boyd.
By Whitaker & Prevost
attys

UNITED STATES PATENT OFFICE.

NATHAN ELLINGTON BOYD, OF KENLEY, ENGLAND.

BICYCLE-BRAKE.

SPECIFICATION forming part of Letters Patent No. 665,306, dated January 1, 1901.

Application filed July 17, 1899. Serial No. 724,101. (No model.)

*To all whom it may concern:*

Be it known that I, NATHAN ELLINGTON BOYD, a subject of the Queen of Great Britain, residing at Kenley, in the county of Surrey, England, have invented new and useful Improvements in Brakes for Cycles, of which the following is a specification.

My invention relates to brakes for cycles, and to that class of brakes known as "rim-brakes," the object of my invention being to provide a brake which will obviate the liability of the braked wheel being suddenly locked against rotation, as is now frequently the case when a rim-brake is quickly applied.

According to my invention the brake shoes or surfaces instead of being rigid and adapted to press directly upon the rim are each provided with one, two, or more rollers, of india-rubber or other material, which is or are adapted when in contact with the rim to rotate and also to come more or less in contact with each other, so that as all the rollers rotate in the same direction the contact with the adjacent roller or rollers will tend to check the rotation, and one of said rollers is also arranged to engage a frictional surface on the cradle or support in which it is mounted. In practice the rollers adjacent to each side of the rim are mounted upon spindles in a cradle or frame in such a manner that they project from the side of the said cradle nearest to the rim, the said cradles being carried by a fork, which straddles the rim and can be operated to bring the rollers into contact therewith. When I arrange only a single roller in each cradle, I make the said cradle internally of such shape that as the brake is applied the roller will come into contact with the cradle.

I can, if desired, apply brakes made in accordance with my invention to both wheels and provide for operating such brakes either simultaneously or independently.

To enable the invention to be fully understood, I will describe the same by reference to the accompanying drawings, in which—

Figure 1 is a side elevation of a portion of a bicycle having my invention applied to it, and Fig. 2 is a sectional view looking in the direction of the arrow 1 in Fig. 1.

$a$ indicates the steering-wheel fork of the bicycle, and $b$ the wheel-rim.

$c$ is the fork or stirrup, which carries the braking-surfaces, the said fork or stirrup, as shown, being connected to the steering-fork of the bicycle and being adapted to be moved by means of an operating-lever $c'$ upon the handle-bars or by any other suitable means. It is to be understood, however, that although my brake is shown in connection with the front wheel of a cycle it is equally applicable to the rear wheel.

$e\ e$ are the cradles, which carry the wheel-engaging rollers, one of said cradles being attached to each arm of the fork $c$. Each of said cradles is provided (preferably at its forward end) with a frictional surface $e'$.

$d\ d'$ represent the wheel-engaging rollers, which are preferably made of rubber and are mounted upon axles $f\ f$. The axles of the rollers $d$ are mounted in slots $g\ g$, formed in the cradles adjacent to the frictional surface $e'$ thereof, said slots being inclined, so that the rollers $d\ d$ normally rest at the lower ends of said slots out of engagement with the said frictional surfaces. Each cradle is also provided with a roller $d'$, adjacent to the roller $d$, having its axle $f$ mounted in inclined slots $g'$ of greater length than the slots $g$. The rollers $d'$ normally rest at the lower ends of their slots out of contact with the rollers $d$; but when the brake is applied the rollers $d$ $d'$ are moved into engagement with the wheel-rim and are rapidly rotated. This rotation causes the axles $f\ f$ to travel in the slots $g\ g'$, and the rollers $d\ d$ will move forward, so as to engage the adjacent frictional surfaces $e'$ $e'$ of cradles $e\ e$, and the rollers $d'\ d'$ will move forward into engagement each with one of the rollers $d\ d$. The frictional engagement between the rollers $d\ d$ and the frictional surfaces $e'\ e'$ on one side and the rollers $d'\ d'$ on the other side will retard the movement of the rollers $d\ d\ d'\ d'$, and thus retard or brake the wheel.

Having now particularly described and ascertained the nature of my said invention and in what manner the same is to be performed, I declare that what I claim is—

1. In a wheel-brake, the combination with a cradle, provided with two pairs of slots in its side walls inclined to the horizontal, and having a friction-surface at one end of the cradle, a roller mounted on the lower ends of one pair of slots adjacent to but normally out of contact with the said friction-surface, a second roller mounted in the lower ends of said second pair of slots adjacent to but normally out of contact with said first-mentioned rollers, and means for throwing said cradle to throw the said rollers into and out of engagement with a wheel, whereby when said rollers engage the wheel lightly they will revolve out of contact with each other and out of contact with said friction-surface, but when pressed into forcible contact with the wheel, the inclined slots will cause the first-mentioned roller to engage said friction-surface and the second roller will move into frictional engagement with the first-mentioned roller, substantially as described.

2. In a wheel-brake, the combination with a fork, adapted to straddle the wheel-rim, of a cradle carried by each arm of said fork, each cradle being provided with two pairs of slots inclined to the horizontal, and having at one end a friction-surface, a pair of rollers mounted in said slots, out of contact with each other and out of contact with said friction-surface, and means for moving said fork to bring said rollers in contact with the inner face of the wheel-rim, whereby when the rollers are pressed lightly into contact with the rim they will revolve freely out of contact with each other and the cradle, and when pressed forcibly into contact with the rim the inclined slots will cause the rollers adjacent to said friction-surfaces to engage said surfaces and the said rollers to frictionally engage each other, substantially as described.

NATHAN ELLINGTON BOYD.

Witnesses:
JOHN E. BOUSFIELD,
C. G. REDFERN.